United States Patent [19]

March et al.

[11] 4,284,935
[45] Aug. 18, 1981

[54] VEHICLE POWER SEAT ADJUSTER CONTROL SYSTEM

[75] Inventors: Anthony March, Rochester; Thomas E. Horton, Warren, both of Mich.

[73] Assignee: General Motors Corporation, Detroit, Mich.

[21] Appl. No.: 42,097

[22] Filed: May 24, 1979

[51] Int. Cl.³ .............................................. H02P 1/22
[52] U.S. Cl. ................................... 318/280; 318/257; 318/291
[58] Field of Search ............... 318/280, 283, 285, 291, 318/293, 256, 266, 282, 286, 257; 297/344, 345, 346; 296/65 R; 49/665 GA

[56] References Cited

U.S. PATENT DOCUMENTS

| | | | |
|---|---|---|---|
| 2,871,913 | 2/1959 | Appleton | 297/344 X |
| 3,073,180 | 6/1963 | Lohr | 74/665 GA |
| 3,115,328 | 12/1963 | Brown | 297/344 X |
| 3,222,584 | 12/1965 | Du Rocher | 318/293 |
| 3,250,566 | 5/1966 | Rainey | 297/344 X |
| 4,138,630 | 2/1979 | Graham | 318/282 X |
| 4,204,255 | 5/1980 | Cremer | 296/65 R |

Primary Examiner—Ulysses Weldon
Attorney, Agent, or Firm—Richard G. Stahr

[57] ABSTRACT

A vehicle power seat adjuster control system that provides for the pulsed reversal of rotation of the armature of the operating motor of a vehicle power seat adjuster mechanism each time the operating motor is deenergized at the conclusion of each seat adjusting operation.

5 Claims, 9 Drawing Figures

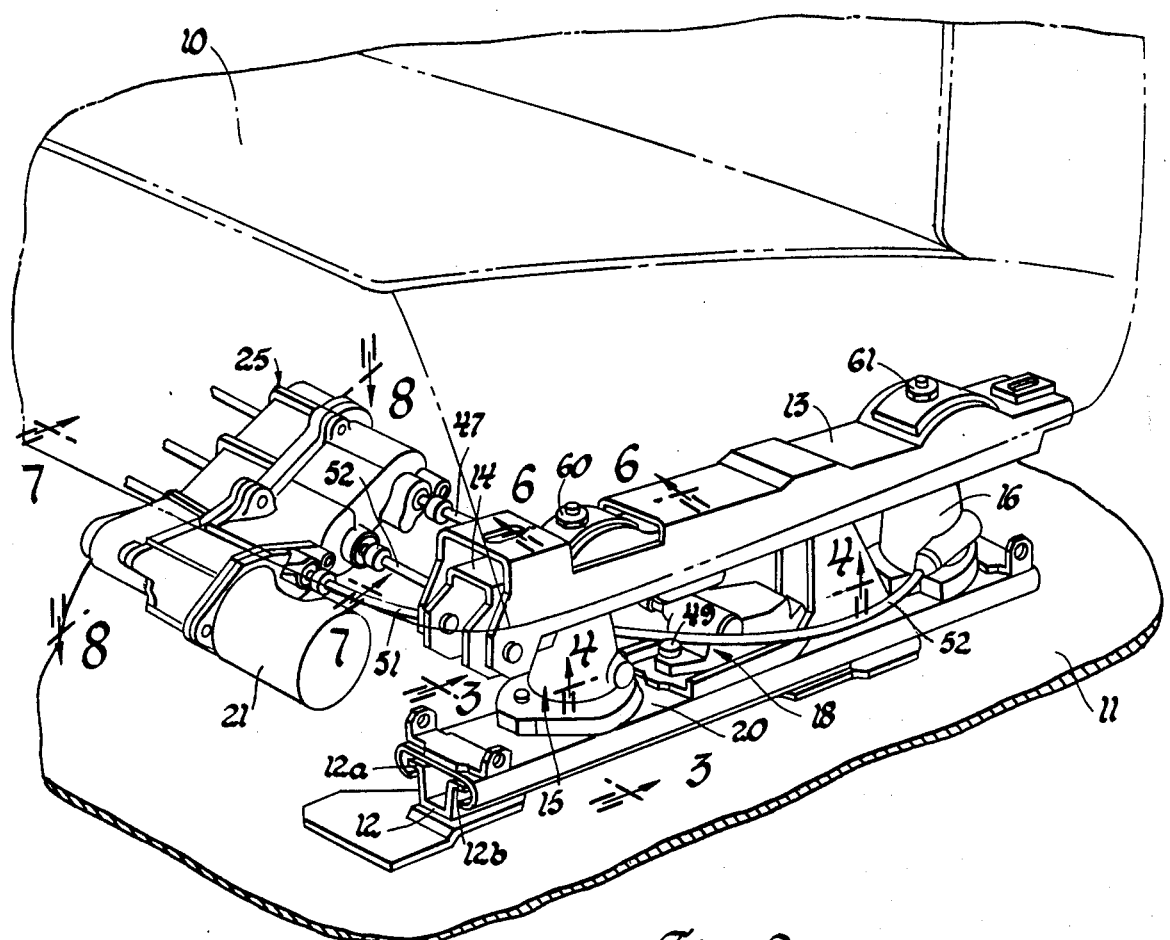
Fig. 2
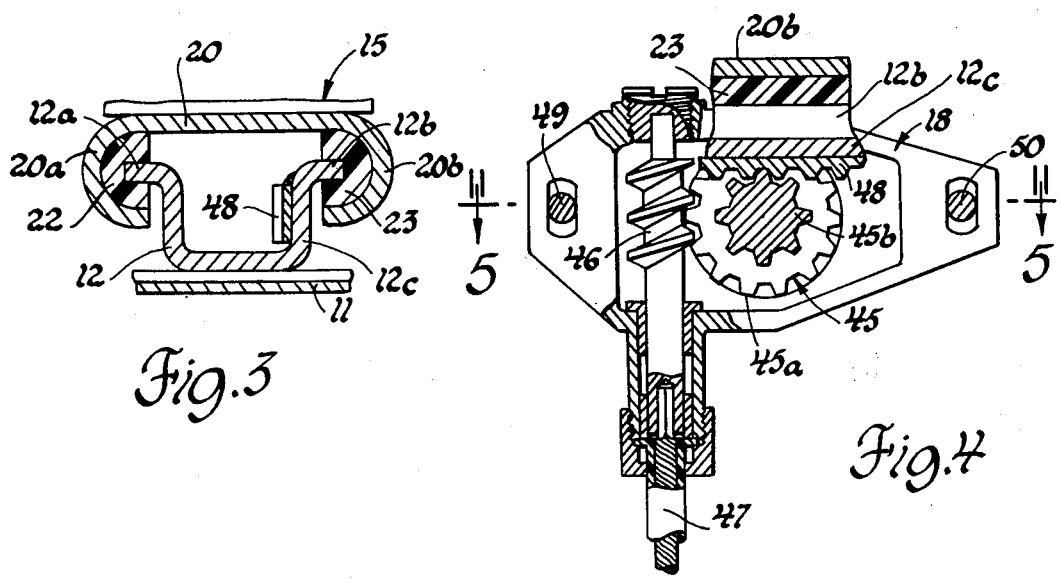
Fig. 3
Fig. 4

VEHICLE POWER SEAT ADJUSTER CONTROL SYSTEM

This invention is directed to vehicle power seat adjuster control systems and, more specifically, to vehicle power seat adjuster control systems that provide for the pulsed reversal of the direction of rotation of the armature of the power seat adjusting mechanism operating motor every time the operating motor is deenergized at the conclusion of a seat adjusting operation.

Many modern vehicle power seat adjuster mechanisms are driven by a bi-directional permanent magnet operating motor that may be energized for armature rotation in first and second opposite directions through the operation of a pair of single pole-double throw relays, each of which has a normally closed contact pair through which a respective side of the operating motor armature is connected to a point of reference or ground potential during periods or relay deenergization. To energize the operating motor for armature rotation in a first direction, a selected one of the relays is energized to electrically open the normally closed contact pair thereof and to electrically close the normally open contact pair thereof to establish an operating motor energizing circuit across a direction current operating potential source. To energize the operating motor for armature rotation in a second opposite direction, the other one of the relays is energized to electrically open the normally closed contact pair thereof and to electrically close the normally open contact pair thereof to establish another opposite direction operating motor energizing circuit across the direct current operating potential source. At the conclusion of each seat adjusting operation, the energized relay is deenergized to permit the normally closed contact pair thereof to electrically reclose thereby connecting both sides of the motor armature to a point of reference or ground potential. Since the operating motor is of the permanent magnet type, the motor becomes dynamically braked with both sides of the armature thereof connected to a point of reference or ground potential. As the seat adjuster mechanism operating devices are coupled to the armature of the operating motor through respective solenoid operated dog-type clutches, should any seat adjusting operation be continued until motor stall and the motor then be dynamically braked upon the deenergization of the energized relay, sufficient torque is maintained by the motor on the solenoid operated clutch to prevent the dogs or teeth of the clutch elements from disengaging. With this condition, the system is effectively locked against movement in any other seat adjusting operations during which the operating motor must rotate in the same direction as that until motor stall. Therefore, a power seat adjuster control system that provides for the pulsed reversal of the direction of rotation of the armature of the operating motor to relieve this "lockup" each time the motor is deenergized is desirable.

It is, therefore, an object of this invention to provide an improved vehicle power seat adjuster control system.

It is another object of this invention to provide an improved power seat adjuster control system that provides for the pulsed reversal of the direction of rotation of the armature of the operating motor of the seat adjuster mechanism every time the motor is deenergized.

In accordance with this invention, a power seat adjuster control system is provided wherein, every time the seat adjuster mechanism operating motor is deenergized, the operating motor armature is pulsed for the reversal of rotation thereof.

For a better understanding of the present invention, together with additional objects, advantages and features thereof, reference is made to the following descriptions and accompanying drawings in which:

FIG. 2 is a perspective view of a power seat adjuster mechanism for one side of a vehicle seat with which the control system of this invention may be employed;

FIG. 3 is a cross-sectional view of FIG. 2 taken along line 3—3 and looking in the direction of the arrows;

FIG. 4 is a cross-sectional view of FIG. 2 taken along line 4—4 and looking in the direction of the arrows;

Figure 1:
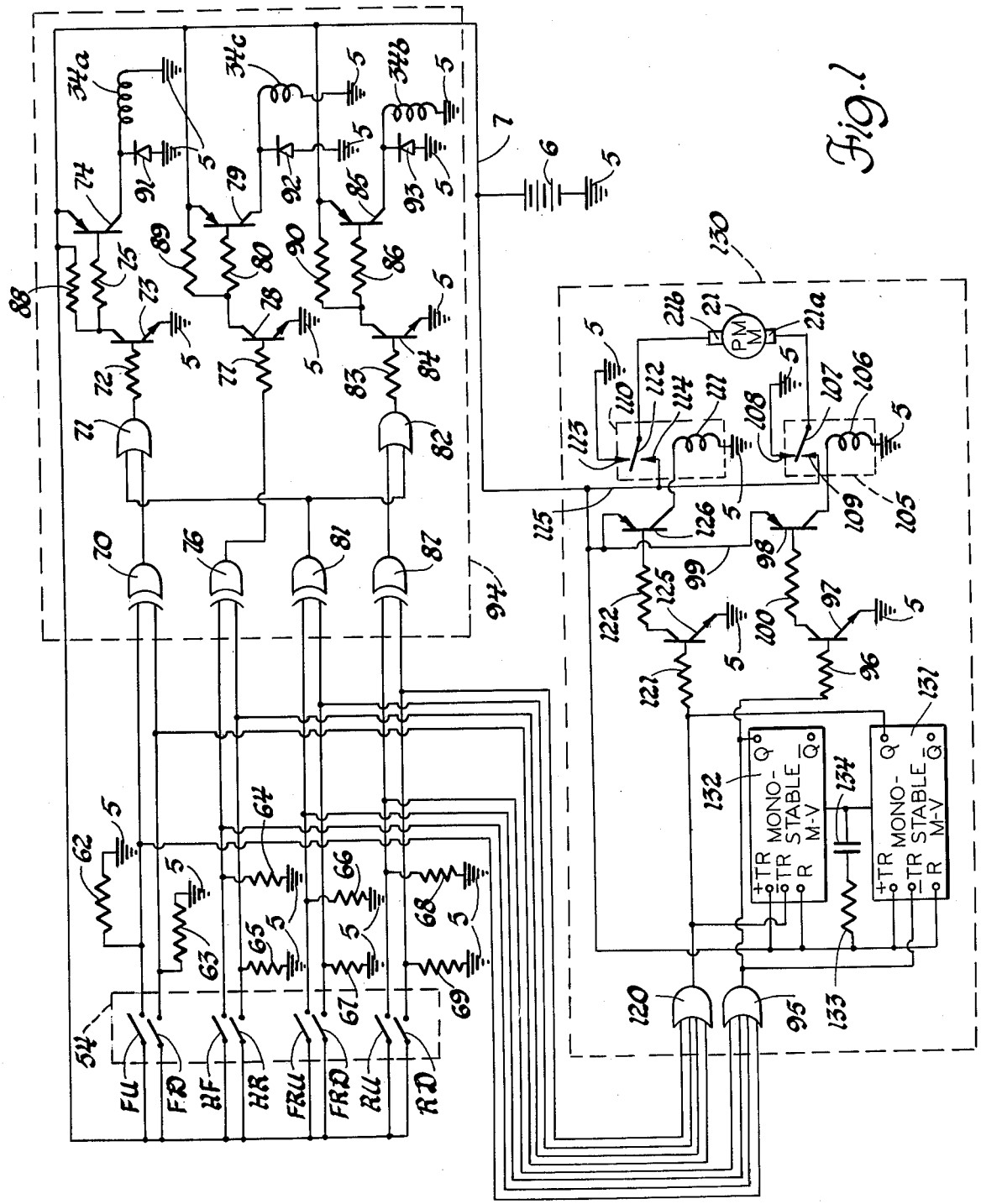
FIG. 1 is a schematic diagram of the power seat adjuster control system of this invention.

As point of reference or ground potential is the same point electrically throughout the system, it has been illustrated in FIG. 1 of the drawing by the accepted schematic symbol and referenced by the numeral 5.

In accordance with logic terminology well-known in the art, throughout this specification logic signals will be referred to as "High" or logic 1 and "Low" or logic 0 signals. For purposes of this specification, and without intention or inference of a limitation thereto, the "High" or logic 1 signals will be considered to be of a positive polarity potential substantially equal to supply potential and the "Low" or logic 0 signals will be considered to be of zero or ground potential.

The subject matter of this application is a power seat adjuster control system for use with power seat adjuster mechanisms of the type that are drivable through a plurality of selectable seat adjusting modes by respective operating devices that may be selectively coupled, in response to an electrical signal indication of the selected seat adjusting mode, to a bi-directional electric operating motor through respective solenoid operated dog-type clutches that may become locked up should the seat be adjusted in any seat adjusting mode until motor stall thus preventing seat adjustment in another mode that requires motor armature rotation in the same direction as that until motor stall. The improvement of this invention comprises circuitry responsive to the termination of the electrical signal indication of any selected seat adjusting mode for effecting for a predetermined period of time the energization of the bi-directional operating motor for armature rotation in the direction opposite to the direction of armature rotation during the period of the electrical signal indication.

FIG. 2 of the drawing is a perspective view of a power seat adjuster mechanism for one side of a vehicle seat 10, shown in phantom line, with which the control system of this invention may be employed. The opposite side of seat 10 is accommodated by an identical seat adjuster mechanism, not shown. As both of the seat adjuster mechanism for vehicle seat 10 operate in an identical manner, only the one illustrated in FIG. 2 will be explained in detail in this specification. Rigidly secured to the vehicle floor 11 in a direction along and substantially parallel to the front-rear axis of the vehicle is a track member 12 for each adjuster mechanism having opposing flange portions 12a and 12b that extend substantially parallel to and are vertically displaced from the vehicle floor 11.

The vehicle seat 10 is mounted upon a pair of double pivotable members 13 and 14 through which the front of seat 10 may be adjusted vertically up and down with respect to the vehicle floor 11 through the operation of front vertical actuator 15 and the rear of seat 10 may be independently adjusted vertically up and down with respect to the vehicle floor 11 through the operation of rear vertical actuator 16. With this arrangement, both pivotable members 13 and 14 may be pivoted about a rear pivot point by the operation of front vertical actuator 15 to move the front of seat 10 vertically upward and downward, both with respect to the vehicle floor 11, and pivotable member 13 may be pivoted about a front pivot point by the operation of rear vertical actuator 16 to move the rear of seat 10 vertically upward and downward, both with respect to the vehicle floor 11. By the operation of front vertical actuator 15, therefore, seat 10 may be driven through a front of seat up seat adjusting mode and a front of seat down seat adjusting mode, both with respect to the vehicle floor 11, and by the operation of rear vertical actuator 16, seat 10 may be driven through a rear of seat up seat adjusting mode and a rear of seat down seat adjusting mode, both with respect to the vehicle floor 11.

Pivotable members 13 and 14, front and rear vertical actuators 15 and 16 and horizontal actuator 18 are mounted upon a slide member 20 that is slidably movable along the front-rear axis of track member 12. Upon the operation of horizontal actuator 18, slide member 20, front and rear vertical actuators 15 and 16, horizontal actuator 18, pivotable members 13 and 14 and vehicle seat 10 may be moved in forward and rearward directions, both with respect to the vehicle front and rear, respectively. A bi-directional direct current operating motor 21 may be selectively coupled to front and rear vertical actuators 15 and 16 and horizontal actuator 18 through respective solenoid operated dog-type clutches contained within transmission assembly 25. In an actual embodiment, bi-directional operating motor 21 is of the permanent magnet type.

Referring to FIG. 3, a cross-section view of FIG. 2 taken along line 3—3 and looking in the direction of the arrows, flange portions 12a and 12b of track member 12 are slidably accommodated by respective corresponding slots in bearing members 22 and 23 that are mounted within respective opposite channel portions 20a and 20b of slide member 20. Bearing members 22 and 23 may be of a plastic material such as polytetrafluoroethylene that provides a low friction bearing surface for flange portions 12a and 12b. In the actual embodiment, bearing member 22 is one of a plurality of identical bearing members spaced along the length of channel portion 20a of slide member 20 and bearing member 23 is one of a plurality of identical bearing members spaced along the length of channel portion 20b. With this arrangement, slide member 20 may be slidably driven by the operation of horizontal actuator 18 in both forward and rearward directions along the front-rear axis of track member 12 to move seat 10 in a seat forward seat adjusting mode and in a seat rearward seat adjusting mode, both with respect to the front and rear ends of the vehicle, respectively.

Figure 9:
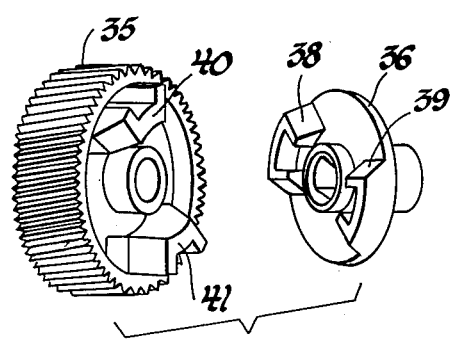
FIG. 9 is an exploded perspective view of a portion of FIGS. 7 and 8.
Figure 7:
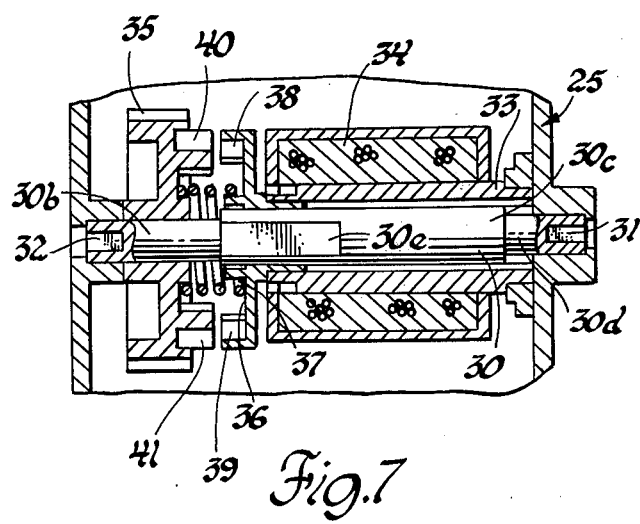
FIG. 7 is a cross-sectional view of FIG. 2 taken along line 7—7 and looking in the direction of the arrows.

In FIG. 7, a cross-section view of FIG. 2 taken along line 7—7 and looking in the direction of the arrows, one of the solenoid operated dog-type clutches contained within transmission assembly 25 is shown in cross-section. As all of the three dog-type clutches contained within transmission assembly 25 are identical, only one will be explained in detail. A shaft member 30 having squared holes 31 and 32 in each end is rotatably mounted within the housing of transmission assembly 25. A plunger member 33 of a magnetic material surrounds shaft member 30 and is, in turn, surrounded by operating solenoid 34. A clutch gear 35 is rotatably mounted upon the end of shaft 30 opposite plunger member 33 and a sliding clutch member 36 is slidably mounted upon shaft member 30 between the adjacent end of plunger member 33 and clutch gear 35 and is arranged to rotate shaft member 30. In the actual embodiment, the bore through sliding clutch member 36 has two opposed flat surfaces that are arranged to accommodate two corresponding opposed flat surfaces upon shaft member 30, one of which is referenced as 30e. With this arrangement, sliding clutch member 36 may be slid along the long axis of shaft member 30 but will rotate shaft member 30. The bore through sliding clutch member 36 is best illustrated in FIG. 9 that is an exploded perspective view of the adjacent face surfaces of clutch gear 35 and sliding clutch member 36. The remaining portions 30b, 30c and 30d of shaft member 30 are of a round cross section so that shaft member 30 may rotate freely within plunger member 33 and the bearing surfaces on each side of the housing of transmission assembly 25 and so that clutch gear 35 may rotate freely about shaft member 30. Compression spring 37 exerts a force sufficient to hold clutch gear 35 and sliding clutch member 36 separated during the periods of operating solenoid 34 deenergization but less than the force exerted by plunger member 33 upon the energization of operating solenoid 34 so that the force exerted by plunger member 33 upon the energization of operating solenoid 34 compresses compression spring 37 to permit the two clutch teeth 38 and 39 on a face surface of sliding clutch member 36 to be slid into meshing engagement with the two clutch teeth 40 and 41 on the adjacent face surface of clutch gear 35.

Figure 8:
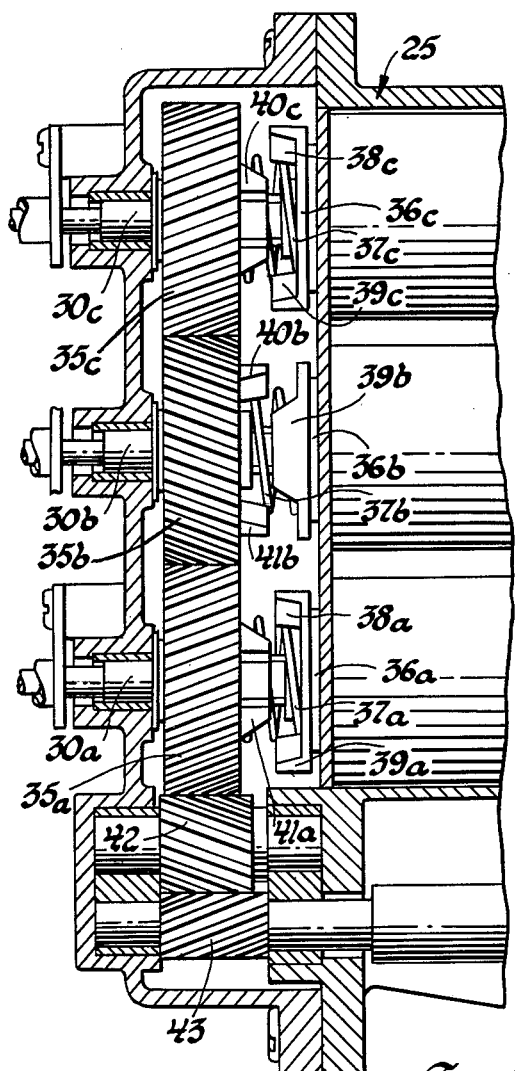
FIG. 8 is a cross-sectional view of FIG. 2 taken along line 8—8 and looking in the direction of the arrows.

In FIG. 8 of the drawings, a cross section view of FIG. 2 taken along line 8—8 and looking in the direction of the arrows, the three solenoid clutch shaft members 30a, 30b and 30c; the three solenoid clutch gears 35a, 35b and 35c; the three solenoid clutch sliding members 36a, 36b and 36c; the three solenoid clutch compression springs 37a, 37b and 37c; clutch tooth 41a of clutch gear 35a, clutch teeth 40b and 41b of clutch gear 35b and clutch tooth 40c of clutch gear 35c; and clutch teeth 38a and 39a of clutch sliding member 36a, clutch tooth 39b of clutch sliding member 36b and clutch teeth 38c and 39c of clutch sliding member 36c are shown assembled within the housing of transmission assembly 25. The gear teeth of each of clutch gears 35a, 35b and 35c, the gear teeth of idler gear 42 and the gear teeth of drive gear 43 are in permanent meshing engagement with the gear teeth of each adjacent gear with drive gear 43 being arranged to be driven by the armature of operating motor 21 in any suitable manner well-known in the art. Consequently, upon the rotation of the armature of operating motor 21, the drive gear 43 driven thereby, idler gear 42 and the three solenoid clutch gears 35a, 35b and 35c are all rotated simultaneously. Upon the energization of the operating solenoid of any of the dog-type clutches contained within transmission assembly 25, the corresponding solenoid plunger member 33 is moved in a direction to compress the corresponding compression spring member 37 to slide the corresponding clutch sliding member 36 along the corresponding shaft member 30 in a direction toward the corresponding clutch gear 35. When the clutch sliding member 36 has been slid a sufficient distance along shaft member 30, the clutch teeth 38 and 39 upon the face surface of sliding clutch member 36 are operated into meshing engagement with the clutch teeth 40 and 41 upon the adjacent face surface of clutch gear 35. Upon this engagement, shaft member 30 is driven by operating motor 21 through drive gear 43, idler gear 42, clutch gear 35 and sliding clutch member 36. A solenoid operated clutch assembly of the type herein described is shown and described in detail in U.S. Pat. No. 3,073,180, T. E. Lohr, that issued Jan. 15, 1963 and is assigned to the same assignee as is this invention.

In a manner well-known in the art, vertical actuators 15 and 16 and horizontal actuator 18 may be coupled to the shaft member 30 of the corresponding solenoid operated dog-type clutch contained within transmission assembly 25 through respective flexible drive shafts.

Figure 5:
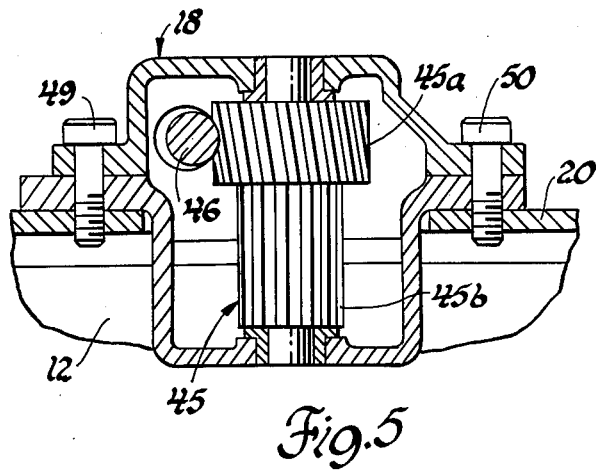
FIG. 5 is a cross-sectional view of FIG. 4 taken along line 5—5 and looking in the direction of the arrows.

Horizontal actuator 18 is illustrated in section in FIG. 4, a cross section view of FIG. 2 taken along line 4—4 and looking in the direction of the arrows, and in FIG. 5, a cross section view of FIG. 4 taken along line 5—5 and looking in the direction of the arrows. Rotatably mounted within the housing of horizontal actuator 18 is a pinion gear generally referenced by the numeral 45 having a first set of teeth 45a and a second set of teeth 45b. The teeth of a worm gear 46 are in meshing engagement with the teeth 45a of pinion gear 45. Worm gear 46 is driven by the armature of operating motor 21 through the corresponding solenoid operated dog-type clutch contained within transmission assembly 25 and flexible drive shaft 47 through which horizontal actuator 18 is coupled to the corresponding solenoid operated dog-type clutch contained within transmission assembly 25. The teeth 45b of pinion gear 45 are in meshing engagement with the teeth of a rack 48 rigidly secured to the substantially vertical side wall 12c of track member 12. The rack 48 secured to track member 12 is best illustrated in FIG. 3. As horizontal actuator 18 is rigidly secured to slide member 20 by bolts 49 and 50, FIG. 5, the armature of operating motor 21 rotates pinion gear 45 through the solenoid operated dog-type clutch contained within transmission assembly 25 corresponding to horizontal actuator 18, flexible drive shaft 47 and worm gear 46, the assembly including slide member 20, vertical actuators 15 and 16, horizontal actuator 18, the double pivotable members 13 and 14 and seat 10 are moved as a unit along track member 12. When pinion gear 45 is rotated by worm gear 46 in a clockwise direction, as looking downwardly toward the vehicle floor 11, seat 10 is moved in a rearward direction toward the rear of the vehicle in a seat rearward seat adjusting mode and when pinion gear 45 is rotated by worm gear 46 in a counter clockwise direction, as looking downwardly toward the vehicle floor 11, seat 10 is moved in a forward direction toward the front of the vehicle in a seat forward seat adjusting mode.

Figure 6:
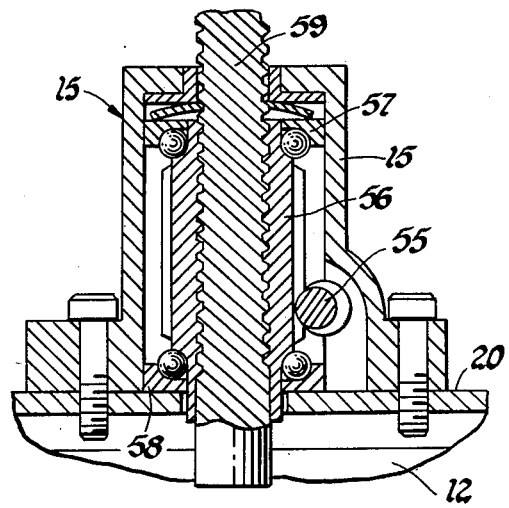
FIG. 6 is a cross-sectional view of FIG. 2 taken along line 6—6 and looking in the direction of the arrows.

Vertical actuator 15 is illustrated in section in FIG. 6, a cross section view of FIG. 2 taken along line 6—6 and looking in the direction of the arrows. As vertical actuator 16 is identical in operation to vertical actuator 15, only vertical actuator 15 will be described in detail in this specification. The solenoid operated dog-type clutch contained within transmission assembly 25 corresponding to vertical actuator 15 is coupled to vertical actuator 15 through flexible drive shaft 51, FIG. 2, in a manner wellknown in the art. In this regard, the solenoid operated dog-type clutch contained within transmission assembly 25 that corresponds to vertical actuator 16 is coupled thereto through flexible drive shaft 52, FIG. 2. The teeth of worm gear 55 of vertical actuator 15 are in meshing engagement with the teeth of a gear nut 56 having an internal threaded bore that is mounted for rotation within vertical actuator 15 by respective upper and lower ball bearing assemblies 57 and 58. Vertical shaft 59 is provided with threads that are made to be accommodated by the threads of the bore of gear unit 56. Consequently, when the armature of operating motor 21 rotates worm gear 55 in a first direction through the solenoid operated dog-type clutch contained within transmission assembly 25 corresponding to vertical actuator 15 and flexible shaft 51, gear nut 56 is rotated thereby in a first direction to drive vertical shaft 59 in a first direction and when the armature of operating motor 21 rotates worm gear 55 in a second opposite direction through the solenoid operated dog-type clutch contained within transmission assembly 25 corresponding to vertical actuator 15 and flexible shaft 51, gear nut 56 is rotated thereby in a second opposite direction to drive vertical shaft 59 in a second opposite direction. As vertical shaft 59 is connected to pivotable member 14 by a nut 60, FIG. 2, threaded onto the threaded extremity thereof opposite gear nut 56, upon the operation of vertical actuator 15 by operating motor 21 through the solenoid operated dog-type clutch contained within transmission assembly 25 corresponding to vertical actuator 15 and flexible drive shaft 51, the front of seat 10 may be adjusted in a vertical direction upward in a front of seat up seat adjusting mode and in a vertical direction downward in a front of seat down seat adjusting mode, both with respect to vehicle floor 11.

As the vertical shaft of vertical actuator 16 corresponding to vertical shaft 49 of vertical actuator 15 is connected to pivotable member 13 by a nut 61, FIG. 2, threaded onto the threaded extremity thereof opposite the corresponding gear nut, upon the operation of vertical actuator 16 by operating motor 21 through the solenoid operated dog-type clutch contained within transmission assembly 25 corresponding to vertical actuator 16 and flexible drive shaft 52, the rear of seat 10 may be adjusted in a vertical direction upward in a rear of seat up seat adjusting mode and in a vertical direction downward in a rear of seat down seat adjusting mode, both with respect to vehicle floor 11.

The power seat adjuster control system of this invention is set forth in schematic form in FIG. 1. Briefly, this circuitry is responsive to an electrical signal indication of a selected seat adjusting mode for effecting the energization of the solenoid operated clutch through which the operating device that drives the seat adjuster mechanism through the selected seat adjusting mode is coupled to the operating motor; for effecting the energization of the operating motor for armature rotation in the direction to effect seat adjustment in the selected mode and is responsive to the termination of the electrical signal indication of the selected seat adjusting mode for effecting for a predetermined period of time the energization of the operating motor for armature rotation in the direction opposite to the direction of armature rotation during the period of the electrical signal indication whereby any lock-up of the solenoid operated clutch that may occur should the seat be adjusted in any seat adjusting mode until motor stall is relieved.

In FIG. 1 of the drawings, the eight single pole-single throw seat adjusting mode electrical selector switches contained within dashed rectangle 54 may be a cluster of switches mounted in one or more locations within the passenger compartment of the vehicle with which the power seat adjuster control system of this invention is being used, as is well-known in the art. Usually, the seat adjusting mode electrical selector switches currently employed are of the type that are spring biased for return to the electrical circuit open condition upon the release of force upon the operating handle to operate the switch to the electrical circuit closed condition.

Upon the operation of either selector switch FU or selector switch FD of the FU-FD selector switch pair to the electrical circuit closed condition, a logic 1 electrical signal indication of the selected front of seat up seat adjusting mode appears across resistor 62 or a logic 1 electrical signal indication of the selected front of seat down seat adjusting mode appears across resistor 63, respectively. Upon the operation of either selector switch HF or selector switch HR of the HF-HR selector switch pair to the electrical circuit closed condition, a logic 1 electrical signal indication of the selected seat horizontal forward seat adjusting mode appears across resistor 64 or a logic 1 electrical signal indication of the selected seat horizontal rearward seat adjusting mode appears across resistor 65, respectively. Upon the operation of either selector switch FRU or selector switch FRD of the FRU-FRD selector switch pair to the electrical circuit closed condition, a logic 1 electrical signal indication of the selected front and rear of seat up seat adjusting mode appears across resistor 66 or a logic 1 electrical signal indication of the selected front and rear of seat down seat adjusting mode appears across resistor 67, respectively. Upon the operation of either selector switch RU or selector switch RD of the RU-RD selector switch pair to the electrical circuit closed condition, a logic 1 electrical signal indication of the selected rear of seat up seat adjusting mode appears across resistor 68 or a logic 1 electrical signal indication of the selected rear of seat down seat adjusting mode appears across resistor 69, respectively. The single pole-single-throw electrical selector switches contained within dashed rectangle 54, therefore, are effective to produce an electrical signal indication of each selected seat adjusting mode.

A logic 1 electrical signal indication of a selected seat adjusting mode appearing across either resistor 62 or resistor 63 is gated through a conventional exclusive OR gate 70 and is applied to one of the input terminals of a conventional OR gate 71. In response to this logic 1 input signal, OR gate 71 produces a logic 1 output signal that supplies base-emitter drive current through resistor 72 to NPN transistor 73 to render this device conductive through the collector-emitter electrodes. Upon the conduction of NPN transistor 73, emitter-base drive current is supplied to PNP transistor 74 through a circuit that may be traced from the positive polarity output terminal of battery 6, through positive polarity potential lead 7, the emitter-base electrodes of PNP transistor 74, resistor 75, the collector-emitter electrodes of NPN transistor 73 and point of reference or ground potential 5 to the negative polarity output terminal of battery 6. This emitter-base drive current renders PNP transistor 74 conductive through the emitter-collector electrodes thereof to complete an energizing circuit for operating solenoid 34a of the solenoid operated clutch contained within transmission assembly 25 corresponding to vertical actuator 15. This energizing circuit may be traced from the positive polarity output terminal of battery 6, through positive polarity potential lead 7, the emitter-collector electrodes of PNP transistor 74, operating solenoid 34a and point of reference or ground potential 5 to the negative polarity output terminal of battery 6. A logic 1 electrical signal indication of a selected seat adjusting mode appearing across either resistor 64 or resistor 65 is gated through a conventional exclusive OR gate 76 to supply base-emitter drive current through resistor 77 to NPN transistor 78 to render this device conductive through the collector-emitter electrodes. Upon the conduction of NPN transistor 78, emitter-base drive current is supplied to PNP transistor 79 through a circuit that may be traced from the positive polarity output terminal of battery 6, through positive polarity potential lead 7, the emitter-base electrodes of PNP transistor 79, resistor 80, the collector-emitter electrodes of NPN transistor 78 and point of reference or ground potential 5 to the negative polarity output terminal of battery 6. This emitter-base drive current renders PNP transistor 79 conductive through the emitter-collector electrodes thereof to complete an energizing circuit for operating 34c of the solenoid operated clutch contained within transmission assembly 25 corresponding to horizontal solenoid actuator 18. This energizing circuit may be traced from the positive polarity output terminal of battery 6, through positive polarity potential lead 7, the emitter-collector electrodes of PNP transistor 79, operating solenoid 34c and point of reference or ground potential 5 to the negative polarity output terminal of battery 6. A logic 1 electrical signal indication of a selected seat adjusting mode appearing across either resistor 66 or resistor 67 is gated through a conventional exclusive OR gate 81 and is applied to one of the input terminals of conventional OR gate 71 and to one of the input terminals of conventional OR gate 82. Each of OR gates 71 and 82, in response to this logic 1 input signal applied to a respective one of the input terminals thereof, produces a logic 1 output signal. The logic 1 output signal produced by OR gate 71 effects the energization of operating solenoid 34a of the solenoid operated clutch contained within transmission assembly 25 corresponding to vertical actuator 15 in a manner previously explained. The logic 1 output signal of OR gate 82 supplies base-emitter drive current through resistor 83 to NPN transistor 84 to render this device conductive through the collector-emitter electrodes. Upon the conduction of NPN transistor 84, emitter-base drive current is supplied to PNP transistor 85 through a circuit that may be traced from the positive polarity output terminal of battery 6, through positive polarity potential lead 7, the emitter-base electrodes of PNP transistor 85, resistor 86, the collector-emitter electrodes of NPN transistor 84 and point of reference or ground potential 5 to the negative polarity output terminal of battery 6. This emitter-base drive current renders PNP transistor 85 conductive through the emitter-collector electrodes to complete an energizing circuit for operating solenoid 34b of the solenoid operated clutch contained within transmission assembly 25 corresponding to vertical actuator 16. This energizing circuit may be traced from the positive polarity output terminal of battery 6, through positive polarity potential lead 7, the emitter-collector electrodes of PNP transistor 85, operating solenoid 34b and point of reference or ground potential 5 to the negative polarity output terminal of battery 6. A logic 1 electrical signal indication of a selected seat adjusting mode appearing across either resistor 68 or resistor 69 is gated through a conventional exclusive OR gate 87 and is applied to one of the input terminals of a conventional OR gate 82. In response to this logic 1 input signal, OR gate 82 produces a logic 1 output signal that effects the energization of operating solenoid 34b of the solenoid operated clutch contained within transmission assembly 25 corresponding to vertical actuator 16 in a manner previously explained. Resistors 88, 89 and 90 are base bias resistors for respective PNP transistors 74, 79 and 85. Diodes 91, 92 and 93 are the conventional "freewheeling" diodes for respective operating solenoids 34a, 34c and 34b. Exclusive OR gates 70, 76, 81 and 87 are employed for the purpose of maintaining the control system of this invention disabled should both of the electrical selector switches of any of the FU-FD, HF-HR, FRU-FRD or RU-RD selector switch pairs be simultaneously operated to the electrical circuit closed condition. In response to the logic 1 input signal upon both input terminals thereof in the event of a dual operation to the electrical circuit closed condition of any selector switch pair, the corresponding exclusive OR gate produces a logic 0 output signal. From this description, it is apparent that the circuitry contained within dashed rectangle 94 is responsive to any one of the electrical signal indications of a selected seat adjusting mode for effecting the energization of the solenoid operated clutch through which the operating device that drives the seat adjuster mechanism through the selected seat adjusting mode is coupled to the operating motor.

A logic 1 electrical signal indication of a selected seat adjusting mode appearing across either resistor 62 or resistor 64 or resistor 66 or resistor 68 is applied to a respective input terminal of a conventional OR gate 95. In response to this logic 1 input signal, OR gate 95 produces a logic 1 output signal that supplies base-emitter drive current through resistor 96 to NPN transistor 97 to render this device conductive through the collector-emitter electrodes. Upon the conduction of NPN transistor 97, base-emitter drive current is supplied to PNP transistor 98 through a circuit that may be traced from the positive polarity output terminal of battery 6, through positive polarity potential lead 7, lead 99, the emitter-base electrodes of PNP transistor 98, resistor 100, the collector-emitter electrodes of NPN transistor 97 and point of reference or ground potential 5 to the negative polarity output terminal of battery 6. This emitter-base drive current renders PNP transistor 98 conductive through the emitter-collector electrodes to complete an energizing circuit for operating coil 106 of a single pole-double throw relay 105. This energizing circuit may be traced from the positive polarity output terminal of battery 6, through positive polarity potential lead 7, lead 99, the emitter-collector electrodes of PNP transistor 98, operating coil 106 of relay 105 and point of reference or ground potential 5 to the negative polarity output terminal of battery 6. Upon the energization of operating coil 106 of relay 105, the movable contact 107 thereof is operated out of electrical circuit engagement with stationary contact 108 and into electrical circuit engagement with stationary contact 109. Upon the operation of movable contact 107 into electrical circuit engagement with stationary contact 109 an energizing circuit is completed for operating motor 21 in a direction from motor brush 21a toward motor brush 21b and may be traced from the positive polarity output terminal of battery 6, through positive polarity potential lead 7, lead 115, closed contacts 109 and 108 of relay 105, operating motor 21 in a direction from brush 21a toward brush 21b, closed contacts 112 and 113 of relay 110 and point of reference or ground potential 5 to the negative polarity output terminal of battery 6. Upon the completion of this energizing circuit, the armature of operating motor 21 revolves in the direction to drive the vehicle seat through either the front of seat up seat adjusting mode or the seat horizontal forward seat adjusting mode or the front and rear of seat up seat adjusting mode or the rear of seat up seat adjusting mode. A logic 1 electrical signal indication of a selected seat adjusting mode appearing across either resistor 63 or resistor 65 or resistor 67 or resistor 69 is applied to a respective input terminal of a conventional OR gate 120. In response to this logic 1 input signal, OR gate 120 produces a logic 1 output signal that supplies base-emitter drive current through resistor 121 to NPN transistor 125 to render this device conductive through the collector-emitter electrodes. Upon the conduction of NPN transistor 125, emitter-base drive current is supplied to PNP transistor 126 through a circuit that may be traced from the positive polarity output terminal of battery 6, through positive polarity potential lead 7, the emitter-base electrodes of PNP transistor 126, resistor 122, the collector-emitter electrodes of NPN transistor 125 and point of reference or ground potential 5 to the negative polarity output terminal of battery 6. This emitter-base drive current renders PNP transistor 126 conductive through the emitter-collector electrodes to complete an energizing circuit for operating coil 111 of double pole-double throw relay 110. This energizing circuit may be traced from the positive polarity output terminal of battery 6, through positive polarity potential lead 7, the emitter-collector electrodes of PNP transistor 126, operating coil 111 of relay 110 and point of reference or ground potential 5 to the negative polarity output terminal of battery 6. Upon the energization of operating coil 111 of relay 110, the movable contact 112 thereof is operated out of electrical circuit engagement with stationary contact 113 and into electrical circuit engagement with stationary contact 114. Upon the operation of movable contact 112 into electrical circuit engagement with stationary contact 114, an energizing circuit is completed for operating motor 21 in a direction from motor brush 21b toward motor brush 21a and may be traced from the positive polarity output terminal of battery 6, through positive polarity potential lead 7, lead 115, closed contacts 114 and 112 of relay 110, operating motor 21 in a direction from brush 21b toward brush 21a, closed contacts 107 and 108 of relay 105 and point of reference or ground potential 5 to the negative polarity output terminal of battery 6. Upon the completion of this energizing circuit, the armature of operating motor 21 revolves in the direction to drive the vehicle seat through either the front of seat down seat adjusting mode or the seat horizontal rearward seat adjusting mode or the front and rear of seat down seat adjusting mode or the rear of seat down seat adjusting mode. From this description, it is apparent that upon the operation of movable contact 107 of relay 105 into electrical circuit engagement with stationary contact 109, operating motor 21 is energized for armature rotation in a first direction and upon the operation of movable contact 112 of relay 110 into electrical circuit engagement with stationary contact 114, operating motor 21 is energized for armature rotation in a second opposite direction. So long as any one of the selector switches contained within dashed rectangle 54 is maintained operated into the electrical circuit closed condition, the corresponding OR gate 95 or OR gate 120 maintains an output signal that sustains the energization of operating motor 21. Upon the subsequent release of any one of these selector switches, the output signal of the corresponding OR gate 95 or OR gate 120 goes to a logic 0 that renders the respective NPN transistor 97 or NPN transistor 125 not conductive to interrupt the emitter-base drive current circuit for the corresponding PNP transistor 98 or PNP transistor 126, a condition which effects the interruption of the previously described operating motor 21 energizing circuit. From this discussion, it is apparent that OR gate 95 produces an output signal in response to and for the duration of any one of the electrical signal indications of selected seat adjusting modes that require operating motor energization for armature rotation in the same first direction and that OR gate 120 produces an output signal in response to and for the duration of any one of the electrical signal indications of seat adjusting modes that require operating motor energization for armature rotation in the same second opposite direction. Further, it is apparent from the foregoing description that the circuitry enclosed within dashed rectangle 130 is responsive to any one of the electrical signal indications of a selected seat adjusting mode for effecting the energization of the operating motor for armature rotation in the direction to effect seat adjustment in the selected seat adjusting mode.

To effect for a predetermined period of time the energization of operating motor 21 for armature rotation in the direction opposite to the direction of armature rotation during the period of any one of the electrical signal indications of a selected seat adjusting mode whereby any lock-up of the solenoid operated clutch that may occur should the seat be adjusted in any seat adjusting mode until motor stall is relieved, circuitry responsive to the termination of any electrical signal indication is provided. In the actual embodiment, a commercially available dual monostable multivibrator element marketed by the RCA Corporation under the designation CD 4098 BE is employed. These devices provide leading edge triggering or trailing edge triggering and one shot operation for any fixed voltage timing wherein an external resistor and an external capacitor control the timing for the circuit. Further, when these devices are in the normal stable state, a logic 0 signal is present upon the Q output terminal and when in the alternate state, a logic 1 signal is present upon the Q output terminal. In FIG. 1, these two monostable multivibrator circuits are referenced by numerals 131 and 132. To provide trailing edge triggering of these devices by the trailing edge of the output signals of OR gates 95 and 120, the output signal of OR gate 95 is applied to the −TR input terminal of monostable multivibrator circuit 131 and the output signal of OR gate 120 is applied to the −TR input terminal of monostable multivibrator circuit 132. The Q output terminal of monostable multivibrator circuit 131 is connected to the end of resistor 121 opposite the base electrode of NPN transistor 125 and the Q output terminal of monostable multivibrator circuit 132 is connected to the end of resistor 96 opposite the base electrode of NPN transistor 97.

Should it be desired that the vehicle seat be driven through the front of seat up seat adjusting mode, seat adjusting mode selector switch FU is operated to and maintained in the electrical circuit closed condition. The resulting logic 1 electrical signal indication of the selected front of seat up seat adjusting mode appearing across resistor 62 is gated through exclusive OR gate 70 and applied to one of the input terminals of OR gate 71. In response to this logic 1 input signal, OR gate 71 produces a logic 1 output signal that effects the energization of operating solenoid 34a of the solenoid clutch contained within transmission assembly 25 corresponding to front vertical actuator 15 in a manner previously explained in this specification. This logic 1 signal is also applied to the corresponding input terminal of OR gate 95. In response to this logic 1 input signal, OR gate 95 produces a logic 1 output signal that effects the energization of operating motor 21 in a direction from motor brush 21a toward motor brush 21b for armature rotation in the direction to effect seat adjustment in the front of seat up seat adjusting mode in a manner previously explained. Upon the energization of operation solenoid 34a, the teeth 38a and 39a of the sliding clutch member 36a of the solenoid operated dog-type clutch contained within transmission assembly 25 corresponding to front vertical actuator 15 is operated into engagement with the teeth 40a and 41a of the clutch gear 35a in a manner previously explained. Therefore, the armature of operating motor 21 is coupled to worm gear 55 of front vertical actuator 15 through the solenoid operated clutch and flexible shaft 51. Consequently, operating motor 21 drives the seat adjusting mechanism through the front of seat up seat adjusting mode. Upon the operation of seat adjusting mode selector switch FU to the electrical circuit open condition when the seat 10 has been adjusted to the desired position or until seat 10 has been driven through the front of seat up seat adjusting mode until operating motor 21 stall, the logic 1 electrical signal indication of the selected seat adjusting mode is replaced by a logic 0 signal across resistor 62. As a consequence, exclusive OR gate 70 produces a logic 0 output signal that is applied to one of the input terminals of OR gate 71. As there is no logic 1 output signal across either resistor 66 or resistor 67, exclusive OR gate 81 also produces a logic 0 output signal. In response to these two logic 0 output signals, OR gate 71 produces a logic 0 output signal, a condition which renders NPN transistor 73 not conductive as there is no longer base-emitter drive current supplied thereto. When NPN transistor 73 goes not conductive, the previously described circuit through which emitter-base drive current is supplied to PNP transistor 74 is interrupted. As emitter-base drive current is no longer supplied to PNP transistor 74, this device is rendered not conductive through the emitter-collector electrodes to interrupt the previously described energizing circuit for operating solenoid 34a. Also, upon the replacing of the logic 1 electrical signal indication of the selected seat adjusting mode from across resistor 62 by a logic 0 signal, OR gate 95 produces a logic 0 output signal. The fall of the output signal of OR gate 95 when the output signal thereof goes from a logic 1 to a logic 0 triggers monostable multivibrator circuit 131 to the alternate state in which a logic 1 signal is present upon the Q output terminal thereof. Further, with a 0 signal present upon the output of OR gate 95, base-emitter drive current is no longer supplied to NPN transistor 97, a condition which renders this device not conductive through the collector-emitter electrodes. When NPN transistor 97 goes not conductive through the collector-emitter electrodes, the previously described circuit through which emitter-base drive current is supplied to PNP transistor 98 is interrupted. Upon the interruption of this circuit, emitter-base drive current is no longer supplied to PNP transistor 98, consequently, this device goes not conductive through the emitter-collector electrodes thereof to interrupt the previously described energizing circuit for operating coil 106 or relay 105. Upon the interruption of this energizing circuit for operating coil 106, movable contact 107 of relay 105 is operated out of electrical circuit engagement with stationary contact 109 and into electrical circuit engagement with stationary contact 108. The logic 1 signal upon the Q output terminal of monostable multivibrator circuit 131, however, supplies base-emitter drive current through resistor 121 to NPN transistor 125 to render this device conductive through the collector-emitter electrodes thereof. Upon the conduction of NPN transistor 125 through the collector-emitter electrodes, the previously described circuit through which emitter-base drive current is supplied to PNP transistor 126 is completed. Upon the completion of this circuit, PNP transistor 126 is triggered conductive through the emitter-collector electrodes thereof to complete the previously described energizing circuit for operating coil 111 of relay 110. Upon the completion of this energizing circuit, movable contact 112 of relay 110 is operated out of electrical circuit engagement with stationary contact 113 and into electrical circuit engagement with stationary contact 114. Upon the operation of movable contact 112 into electrical circuit engagement with stationary contact 114, a circuit for the energization of operating motor 21 in a direction from motor brush 21b toward motor brush 21a for armature rotation in a direction opposite to the direction of armature rotation during the period of the electrical circuit indication is completed. This circuit may be traced from the positive polarity terminal of battery 6, through positive polarity potential lead 7, closed contacts 114 and 112 of relay 110, operating motor 21 in a direction from brush 21b toward brush 21a, closed contacts 107 and 108 of relay 105 and point of reference or ground potential 5 to the negative polarity output terminal of battery 6. At the conclusion of the time during which monostable multivibrator circuit 131 is in the alternate state as determined by the values of timing resistor 133 and timing capacitor 134, this device spontaneously returns to the original stable state in which a logic 0 signal is present upon the Q output terminal thereof. As this logic 0 output signal does not supply base-emitter drive current to NPN transistor 125, this transistor is rendered not conductive through the collector-emitter electrodes. When NPN transistor 125 goes not conductive, the previously described circuit through which emitter-base drive current is supplied to PNP transistor 126 is interrupted. Upon the interruption of this circuit, emitter-base drive current is no longer supplied to PNP transistor 126, a condition which renders this device not conductive through the emitter-collector electrodes. When PNP transistor 126 goes not conductive, the previously described energizing circuit for operating coil 111 of relay 110 is interrupted. Upon the interruption of this operating coil 111 energizing circuit, movable contact 112 operates out of electrical circuit engagement with stationary contact 114 and into electrical circuit engagement with stationary contact 113. As operating coil 106 of relay 105 is also deenergized at this time, movable contact 107 thereof is in electrical circuit contact with stationary contact 108. Consequently, both sides of operating motor 21 are connected to point of reference or ground potential 5. Therefore, operating motor 21 is dynamically braked to cease armature rotation and the system is prepared for the next electrical signal indication of a seat adjusting mode.

Should it be desired that the vehicle seat be driven through the rear of seat down seat adjusting mode, seat adjusting mode selector switch RD is operated to and maintained in the electrical circuit closed condition. The resulting logic 1 electrical signal indication of the selected rear of seat down seat adjusting mode appearing across resistor 69 is gated through exclusive OR gate 87 and applied to one of the input terminals of OR gate 82. In response to this logic 1 input signal, OR gate 82 produces a logic 1 output signal that effects the energization of operating solenoid 34b of the solenoid clutch contained within transmission assembly 25 corresponding to rear vertical actuator 16 in a manner previously explained in this specification. This logic 1 signal is also applied to the corresponding input terminal of OR gate 120. In response to this logic 1 input signal, OR gate 120 produces a logic 1 output signal that effects the energization of operating motor 21 in a direction from motor brush 21b toward motor brush 21a for armature rotation in the direction to effect seat adjustment in the rear of seat down seat adjusting mode in a manner previously explained. Upon the energization of operation solenoid 34b, the teeth 38b and 39b of the sliding clutch member 36b of the solenoid operated dog-type clutch contained within transmission assembly 25 corresponding to rear vertical actuator 16 is operated into engagement with the teeth 40b and 41b of the clutch gear 35b in a manner previously explained. Therefore, the armature of operating motor 21 is coupled to the worm gear of rear vertical actuator 16 corresponding to worm gear 55 of vertical actuator 15 through the solenoid operated clutch and flexible shaft 52. Consequently, operating motor 21 drives the seat adjusting mechanism through the rear of seat down seat adjusting mode. Upon the subsequent operation of seat adjusting mode selector switch RD to the electrical circuit open condition when the seat 10 has been adjusted to the desired position or until seat 10 has been driven through the rear of seat down seat adjusting mode until operating motor 21 stall, the logic 1 electrical signal indication of the selected seat adjusting mode is replaced by a logic 0 signal across resistor 69. As a consequence, exclusive OR gate 87 produces a logic 0 output signal that is applied to one of the input terminals or OR gate 82. As there is no logic 1 output signal across either resistor 66 or resistor 67, exclusive OR gate 81 also produces a logic 0 output signal. In response to these two logic 0 output signals, OR gate 82 produces a logic 0 output signal, a condition which renders NPN transistor 84 not conductive as there is no longer base-emitter drive current supplied thereto. When NPN transistor 84 goes not conductive, the previously described circuit through which emitter-base drive current is supplied to PNP transistor 85 is interrupted. As emitter-base drive current is no longer supplied to PNP transistor 85, this device is rendered not conductive through the emitter-collector electrodes to interrupt the previously described energizing circuit for operating solenoid 34b. Also, upon the replacing of the logic 1 electrical signal indication of the selected seat adjusting mode from across resistor 69 by a logic 0 signal, OR gate 120 produces a logic 0 output signal. The fall of the output signal of OR gate 120 when the output signal thereof goes from a logic 1 to a logic 0 triggers monostable multivibrator circuit 132 to the alternate state in which a logic 1 signal is present upon the Q output terminal thereof. Further, with a logic 0 signal present upon the output of OR gate 120, base-emitter drive current is no longer supplied to NPN transistor 125, a condition which renders this device not conductive through the collector-emitter electrodes. When NPN transistor 125 goes not conductive through the collector-emitter electrodes, the previously described circuit through which emitter-base drive current is supplied to PNP transistor 126 is interrupted. Upon the interruption of this circuit, emitter-base drive current is no longer supplied to PNP transistor 126, consequently, this device goes not conductive through the emitter-collector electrodes thereof to interrupt the previously described energizing circuit for operating coil 111 of relay 110. Upon the interruption of this energizing circuit for operating coil 111, movable contact 112 of relay 110 is operated out of electrical circuit engagement with stationary contact 114 and into electrical circuit engagement with stationary contact 113. The logic 1 signal upon the Q output terminal of monostable multivibrator circuit 132, however, supplies base-emitter drive current through resistor 96 to NPN transistor 97 to render this device conductive through the collector-emitter electrodes thereof. Upon the conduction f NPN transistor 97 through the collector-emitter electrodes, the previously described circuit through which emitter-base drive current is supplied to PNP transistor 98 is completed. Upon the completion of this circuit, PNP transistor 98 is triggered conductive through the emitter-collector electrodes thereof to complete the previously described energizing circuit for operating coil 106 of relay 105. Upon the completion of this energizing circuit, movable contact 107 of relay 105 is operated out of electrical circuit engagement with stationary contact 108 and into electrical circuit engagement with stationary contact 109. Upon the operation of movable contact 107 into electrical circuit engagement with stationary contact 109, a circuit for the energization of operating motor 21 in a direction from motor brush 21a toward motor brush 21b for armature rotation in a direction opposite to the direction of armature rotation during the period of the electrical circuit indication is completed. This circuit may be traced from the positive polarity terminal of battery 6, through positive polarity potential lead 7, closed contacts 109 and 107 of relay 105, operating motor 21 in a direction from brush 21a toward brush 21b, closed contacts 112 and 113 of relay 110 and point of reference or ground potential 5 to the negative polarity output terminal of battery 6. At the conclusion of the time during which monostable multivibrator circuit 131 is in the alternate state as determined by the values of timing resistor 133 and timing capacitor 134, this device spontaneously returns to the original stable state in which a logic 0 signal is present upon the Q output terminal thereof. As this logic 0 output signal does not supply base-emitter drive current to NPN transistor 97, this transistor is rendered not conductive through the collector-emitter electrodes. When NPN transistor 97 goes not conductive, the previously described circuit through which emitter-base drive current is supplied to PNP transistor 98 is interrupted. Upon the interruption of this circuit, emitter-base drive current is no longer supplied to PNP transistor 98, a condition which renders this device not conductive through the emitter-collector electrodes. When PNP transistor 98 goes not conductive, the previously described energizing circuit for operating coil 106 of relay 105 is interrupted. Upon the interruption of this operating coil 106 energizing circuit, movable contact 107 operates out of electrical circuit engagement with stationary contact 109 and into electrical circuit engagement with stationary contact 108. As operating coil 111 of relay 110 is also deenergized at this time, movable contact 112 thereof is in electrical circuit contact with stationary contact 113. Consequently, both sides of operating motor 21 are connected to point of reference or ground potential 5. Therefore, operating motor 21 is dynamically braked to cease armature rotation and the system is prepared for the next electrical signal indication of a seat adjusting mode.

Should any of the other seat adjusting mode selector switches be operated to and maintained in the electrical circuit closed condition, in response to the resulting electrical signal indication of the selected seat adjusting mode, the circuitry within dashed rectangle 94 operates in a manner previously explained to effect the energization of the operating solenoid of the solenoid operated clutch through which the operating device that drives the seat adjuster mechanism through the selected seat adjusting mode is coupled to the operating motor 21 and, also in response to the electrical signal indication of the selected seat adjusting mode, the circuitry within dashed rectangle 130 operates in a manner previously explained to effect the energization of operating motor 21 for armature rotation in the direction to effect seat adjustment in the selected mode. Upon the subsequent operation of the seat adjusting mode selector switch corresponding to the selected seat adjusted mode to the electrical circuit open condition, in response to the resulting logic 0 signal that replaces the logic 1 electrical signal indication of the selected seat adjusting mode, the circuitry within dashed rectangle 94 operates in a manner previously explained to deenergize the energized solenoid operated clutch operating solenoid and, also in response to the resulting logic 0 signal that replaces the logic 1 electrical signal indication of the selected seat adjusting mode, the circuitry within dashed rectangle 130 operates in a manner previously explained to energize, for a predetermined period of time, operating motor 21 for armature rotation in a direction opposite that during the period of the electrical signal indication.

It may be noted that for the front and rear of seat up seat adjusting mode or for the front and rear of seat down seat adjusting mode, selector switches FRU or FRD, respectively, are operated to the electrical circuit closed condition. In response to either of the resulting logic 1 electrical signal indications of the selected one of these two seat adjusting modes, the circuitry within dashed rectangle 94 operates to effect the energization of both of operating solenoids 34a and 34b of the solenoid operated clutches corresponding to respective vertical actuators 15 and 16.

As has been previously brought out in this specification, OR gate 95 produces an output signal in response to and for the duration of any one of the electrical signal indications of seat adjusting modes that require operating motor energization for armature rotation in the same first direction and OR gate 120 produces an output signal in response to and for the duration of any one of the electrical signal indications of seat adjusting modes that require operating motor energization for armature rotation in the same second opposite direction. Monostable multivibrator circuit 131 is responsive to the termination of the output signal of OR gate 95 for producing an output signal of a predetermined time duration and monostable multivibrator circuit 132 is responsive to the termination of the output signal of OR gate 120 for producing an output signal of a predetermined time duration. Therefore, monostable multivibrator circuit 131 produces an output signal of a predetermined time duration in response to the termination of any one of the electrical signal indication of seat adjusting modes that require operating motor energization for armature rotation in the same first direction and monostable multivibrator circuit 132 produces an output signal of a predetermined time duration in response to the termination of any one of the electrical signal indications of seat adjusting modes that require operating motor energization for armature rotation in the same second opposite direction. In the actual embodiment the time duration of the output signals produced by these monostable multivibrator circuits 131 and 132 is of the order of three milliseconds.

The circuitry including transistors 97, 98, 125 and 126 and relays 105 and 110 is responsive to the output signals of OR gate 95 and OR gate 120 for effecting the energization of the operating motor 21 for armature rotation in respective first and second opposite directions to effect seat adjustment in the selected mode and is responsive to the output signals of monostable multivibrator circuit 131 and of monostable multivibrator circuit 132 for effecting the energization of operating motor 21 for armature rotation in the direction opposite that during the period of the output signal of OR gate 95 and during the period of the output signal of OR gate 120, respectively, whereby any lockup of the solenoid operated clutch that may occur should the seat be adjusted in any seat adjusting mode until motor stall is relieved.

It is apparent from the foregoing detailed description that the power seat adjuster control system of this invention provides for the pulsed reversal of the direction of rotation of the armature of the power seat adjusting mechanism operating motor every time the operating motor is deenergized at the conclusion of a seat adjusting mode.

While a preferred embodiment of the power seat adjuster control system of this invention has been shown and described, it will be obvious to those skilled in the art that various modifications and substitutions may be made without departing from the spirit of the invention that is to be limited only within the scope of the appended claims.

The embodiments of the invention in which an exclusive property or privilege is claimed are defined as follows:

1. A power seat adjuster control system for use with power seat adjuster mechanisms of the type that are drivable through a plurality of selectable seat adjusting modes by respective operating devices that may be selectively coupled to a bi-directional electric operating motor through respective solenoid operated dog-type clutches that may become locked up should the seat be adjusted in any seat adjusting mode until motor stall thus preventing seat adjustment in another mode that requires motor armature rotation in the same direction as that until stall, comprising:
   means for producing an electrical signal indication of each selected seat adjusting mode;
   first circuit means responsive to any one of said electrical signal indications for effecting the energization of the said solenoid operated clutch through which the said operating device that drives said seat adjuster mechanism through the selected seat adjusting mode is coupled to said operating motor; and
   second circuit means responsive to any one of said electrical signal indications for effecting the energization of said operating motor for armature rotation in the direction to effect seat adjustment in the selected mode and responsive to the termination of said electrical signal indication of the selected seat adjusting mode for effecting for a predetermined period of time the energization of said operating motor for armature rotation in the direction opposite to the direction of armature rotation during the period of said electrical signal indication whereby any lock-up of the solenoid operated clutch that may occur should the seat be adjusted in any seat adjusting mode until motor stall is relieved.

2. A power seat adjuster control system for use with power seat adjuster mechanisms of the type that are drivable through a plurality of selectable seat adjusting modes by respective operating devices that may be selectively coupled to a bi-directional electric operating motor through respective solenoid operated dog-type clutches that may become locked up should the seat be adjusted in any seat adjusting mode until motor stall thus preventing seat adjustment in another mode that requires motor armature rotation in the same direction as that until stall, comprising:
   means for producing an electrical signal indication of each selected seat adjusting mode;
   first circuit means responsive to any one of said electrical signal indications for effecting the energization of the said solenoid operated clutch through which the said operating device that drives said seat adjuster mechanism through the selected seat adjusting mode is coupled to said operating motor;
   second circuit means responsive to any one of said electrical signal indications for effecting the energization of said operating motor for armature rotation in the direction to effect seat adjustment in the selected mode; and
   third circuit means included in said second circuit means responsive to the termination of each said electrical signal indication of the selected seat adjusting mode for effecting for a predetermined period of time the energization of said operating motor for armature rotation in the direction opposite to the direction of armature rotation during the period of said electrical signal indication whereby any lock-up of the solenoid operated clutch that may occur should the seat be adjusted in any seat adjusting mode until motor stall is relieved.

3. A power seat adjuster control system for use with power seat adjuster mechanisms of the type that are drivable through a plurality of selectable seat adjusting modes by respective operating devices that may be selectively coupled to a bi-directional electric operating motor through respective solenoid operated dog-type clutches that may become locked up should the seat be adjusted in any seat adjusting mode until motor stall thus preventing seat adjustment in another mode that requires motor armature rotation in the same direction as that until stall, comprising:

means for producing an electrical signal indication of each selected seat adjusting mode, one group thereof indicating respective seat adjusting modes that require operating motor energization for armature rotation in a first direction and another group thereof indicating respective seat adjusting modes that require operating motor energization for armature rotation in a second opposite direction;

first circuit means responsive to any one of said electrical signal indications for effecting the energization of the said solenoid operated clutch through which the said operating device that drives said seat adjuster mechanism through the selected seat adjusting mode is coupled to said operating motor;

second circuit means for producing a first output signal of a predetermined time duration in response to the termination of any one of said electrical signal indications of seat adjusting modes that require operating motor energization for armature rotation in a first direction;

third circuit means for producing a second output signal of a predetermined time duration in response to the termination of any one of the said electrical signal indications of seat adjusting modes that require operating motor energization for armature rotation in a second opposite direction; and circuit means responsive to any one of said electrical signal indications for effecting the energization of said operating motor for armature rotation in the direction to effect seat adjustment in the selected mode and responsive to said first and second output signals for effecting the energization of said operating motor for armature rotation in the direction opposite that during the period of the last terminated said electrical signal indication whereby any lock-up of the solenoid operated clutch that may occur should the seat be adjusted in any seat adjusting mode under motor stall is relieved.

4. A power seat adjuster control system for use with power seat adjuster mechanisms of the type that are drivable through a plurality of selectable seat adjusting modes by respective operating devices that may be selectively coupled to a bi-directional electric operating motor through respective solenoid operated dog-type clutches that may become locked up should the seat be adjusted in any seat adjusting mode until motor stall thus preventing seat adjustment in another mode that requires motor armature rotation in the same direction as that until stall, comprising:

means for producing an electrical signal indication of each selected seat adjusting mode, one group thereof indicating respective seat adjusting modes that require operating motor energization for armature rotation in a first direction and another group thereof indicating respective seat adjusting modes that require operating motor energization for armature rotation in a second opposite direction;

first circuit means responsive to any one of said electrical signal indications for effecting the energization of the said solenoid operated clutch through which the said operating device that drives said seat adjuster mechanism through the selected seat adjusting mode is coupled to said operating motor;

second circuit means for producing a first output signal in response to and for the duration of any one of said electrical signal indications of seat adjusting modes that require operating motor energization for armature rotation in a first direction;

third circuit means for producing a second output signal in response to and for the duration of any one of the said electrical signal indications of seat adjusting modes that require operating motor energization for armature rotation in a second opposite direction;

fourth circuit means responsive to the termination of said first output signal for producing a third output signal of a predetermined time duration;

fifth circuit means responsive to the termination of said second output signal for producing a fourth output signal of a predetermined time duration; and circuit means responsive to said first and second output signals for effecting the energization of said operating motor for armature rotation in respective first and second opposite directions to effect seat adjustment in the selected mode and responsive to said third and fourth output signals for effecting the energization of said operating motor for armature rotation in the direction opposite that during the period of said first output signal and during the period of said second output signal, respectively, whereby any lock-up of the solenoid operated clutch that may occur should the seat be adjusted in any seat adjusting mode until motor stall is relieved.

5. A power seat adjuster control system for use with power seat adjuster mechanisms of the type that are drivable through a plurality of selectable seat adjusting modes by respective operating devices that may be selectively coupled to a bi-directional electric operating motor through respective solenoid operated dog-type clutches that may become locked up should the seat be adjusted in any seat adjusting mode until motor stall thus preventing seat adjustment in another mode that requires motor armature rotation in the same direction as that until stall, comprising:

means for producing an electrical signal indication of each selected seat adjusting mode, one group thereof indicating respective seat adjusting modes that require operating motor energization for armature rotation in a first direction and another group thereof indicating respective seat adjusting modes that require operating motor energization for armature rotation in a second opposite direction;

first circuit means responsive to any one of said electrical signal indications for effecting the energization of the said solenoid operated clutch through which the said operating device that drives said seat adjuster mechanism through the selected seat adjusting mode is coupled to said operating motor;

second circuit means for producing a first output signal in response to and for the duration of any one of said electrical signal indications of seat adjusting modes that require operating motor energization for armature rotation in a first direction;

third circuit means for producing a second output signal in response to and for the duration of any one of the said electrical signal indications of seat adjusting modes that require operating motor energization for armature rotation in a second opposite direction;

fourth circuit means responsive to the termination of said first output signal for producing a third output signal of a predetermined time duration;

fifth circuit means responsive to the termination of said second output signal for producing a fourth output signal of a predetermined time duration;

sixth circuit means responsive to said first and fourth output signals for effecting the energization of said operating motor for armature rotation in a first direction; and seventh circuit means responsive to said second and third output signals for effecting the energization of said operating motor for armature rotation in a second opposite direction whereby through the operation of said sixth and seventh circuit means seat adjustment in the selected mode is effected in response to said first and second output signals and the energization of said operating motor for armature rotation in the direction opposite that during the period of said first and second output signals is effected in response to said third and fourth output signals, respectively, to relieve any lock-up of the solenoid operated clutch that may occur should the seat be adjusted in any seat adjusting mode until motor stall.

* * * * *